United States Patent [19]

Vollman

[11] 4,147,607
[45] Apr. 3, 1979

[54] APPARATUS FOR STIMULATING REMOVAL OF ELECTROLYTIC ENERGY FROM FLUIDS

[75] Inventor: Leonard L. Vollman, St. Louis, Mo.

[73] Assignee: Thermal Engineering Company, St. Louis, Mo.

[21] Appl. No.: 732,532

[22] Filed: Oct. 14, 1976

[51] Int. Cl.² ............................................ C23F 13/00
[52] U.S. Cl. ..................................... 204/196; 204/147
[58] Field of Search ................ 204/147, 196, 148, 197

[56] References Cited

U.S. PATENT DOCUMENTS

| | | | |
|---|---|---|---|
| 597,000 | 1/1898 | Higbee | 285/333 |
| 1,449,991 | 3/1923 | Gunderson | 204/196 |
| 1,608,709 | 11/1926 | Mills | 204/197 |
| 2,642,391 | 6/1953 | Wellman | 204/197 |
| 2,893,938 | 7/1959 | Bremerman | 204/196 |
| 2,910,421 | 10/1959 | Sabins | 204/197 |
| 2,975,769 | 3/1961 | Bremerman | 122/379 |
| 3,215,613 | 11/1965 | Lainson | 204/196 |
| 3,216,916 | 11/1965 | Locke | 204/196 |
| 3,378,472 | 4/1968 | Banks et al. | 204/196 |
| 3,595,774 | 7/1971 | Bremerman | 204/196 |
| 3,620,951 | 11/1971 | Bremerman | 204/196 |

*Primary Examiner*—T. Tung
*Attorney, Agent, or Firm*—Paul M. Denk

[57] ABSTRACT

In an apparatus for stimulating the removal of electrolytic, or electrical, energy from a vessel of water or other charge conducting liquid, a conductive apparatus, preferably formed as a tube, is insulatively supported with respect to the vessel in which the water is being treated, with the apparatus either extending through a wall of the vessel, or being freely supported upon the heat exchanger or other components structurally arranged internally of the vessel. A nonconductive mounting member is secured to the conductive apparatus and provides for the insulation of the apparatus below the vessel's normal water line. The mounting member in addition to being nonconductive, is also nonabsorbent of any moisture even after prolonged submersion in water so as to insure that there is no breakdown in its providing the electrical insulation of the conductive apparatus with respect to the vessel in which it locates. In another embodiment, the mounting members are formed as supports having apertures therethrough and slidingly inserted onto the conductive apparatus tubes so as to insulatingly space the apparatus from the vessel's operating components. Various insulating caps are provided upon the exposed ends of the apparatus tubes so as to insure no contact with any of the vessel's internal components, as aforesaid. Furthermore, the mounting member is provided with specially designed retainers, such as tapered threads, so as to insure a fluid tight seal of the conductive member within the mounting member, in addition to a hermetic seal of the mounting member to any pressure vessel to which it may secure.

7 Claims, 17 Drawing Figures

APPARATUS FOR STIMULATING REMOVAL OF ELECTROLYTIC ENERGY FROM FLUIDS

BACKGROUND OF THE INVENTION

This invention relates generally to water treatment equipment, but more particularly pertains to means for removing the electrolytic activity that can lead to mineral deposition upon the conductive surfaces inherently within such equipment.

The deposit of mineral trace elements within water or other fluids that is being treated by various equipment has long plagued the industry. For example, it has been found that some quantum of electric charge exists within water, particularly that having mineral content, and can cause the water to react as an electrolyte, thereby giving rise to electrolytic action with the water in a manner that deposits its mineral content upon the inner surfaces of the water treatment apparatuses that accommodate the water. For example, the fact that electrolytic action does take place in causing such mineral deposits can be readily deduced from observing the interior of any pipe that is constructed of iron, copper, or any other conductive material, wherein the mineral deposits that uniformly form a scale around the entire inner circumference of the pipe can be readily observed, and in some cases totally occlude the flow of water within the pipe. If it was not an electrolytic form of action that would give rise to such deposits, then the mineral deposits, or its scale, would be thicker at the lower portions of the pipe, than at its upper reaches, since gravity would normally cause a descent of such mineral deposits to this lower vicinity. But, such is not the case, and scale forms around pipes to uniform thicknesses that readily infers that electric charge is causing the mineral and metallic transfer to all reaches uniformly of the internal surfaces of equipment pipe.

But, pipes alone are not attacked by mineral deposits, but rather, any type of apparatuses that require the use of water or other conductive liquids are subjected to such deterioration. Boilers, water heaters, condensers, bottle washers, pasteurizers and water coolers, and related equipment, all are of the type of equipment that can be subjected to the formation of scale upon their inner surfaces, below the water line, if these apparatuses are formed of a conductive material. As previously stated, the electrostatic charge, or minor electric charge, that inherently exits within water or other fluids gives rise to the electrolytic action that causes the transfer of its mineral deposits to the surfaces of the metal apparatuses, wherein the charge seeks its outlet through grounding. Hence, providing some means within the flow of water within these types of apparatuses can effectively ground or diminish the electric charge within such water, and has significantly reduced the damage heretofore sustained by such apparatuses. The formation of scale itself upon the inner surfaces of water treating apparatuses is not in and of itself the only damage perpetrated by this action, but in addition, scale formation usually gives rise to both pitting at the scale metal interface, with corrosion of the metallic surface eventually occurring. It is believed that the electrolytic action gives rise to the generation of free oxygen that can cause some oxidation therein. Obviously, exposing the metal parts to action in the category of pitting and corrosion eventually leads to the embrittlement of the metal itself, and which necessarily results in the destruction of the entire equipment itself. One need only recall how often the domestic or industrial water heaters need to be replaced as a result of accumulated scale, and which eventually leads to corrosion of the metallic components exposed beneath the water line.

Efforts have been made heretofore to seek some correction of this problem that exists with water treating equipment, and generally these prior art devices have been reasonably effective in their operations on the short term, but the component structures of the apparatuses themselves heretofore as designed for detracting from electrolytic conduct within such equipment have usually not been constructed themselves for a long duration. Some such apparatuses have not recognized the need for electrically isolating a conductive ground device within the flow of water within the boiler, so that the charge within the water would be conducted entirely through the device and removed to ground, rather than having the jacket of the boiler itself act as a ground, which has heretofore been tried. Such can be seen in the U.S. Pat. No. to Neeley, 2,499,670, wherein the electrode itself connects through supporting structure to the outer sheet of the boiler, and hence, any grounding achieved in this manner has reduced benefits on the formation of scale upon the inner surfaces of the boiler. But, the earlier U.S. Pat. Nos. to Bremerman, 2,893,938, 2,975,769, 3,595,774, and 3,620,951, recognized the necessity to insulate the electrode from the reservoir surface so that a more effective grounding of the electrode can be made. But, many of the insulating components of these prior art electrodes were formed mainly for their ability to prevent electric charge transfer, and such components usually were constructed of Bakelite, or some other resin formed insulators. The problems with this type of insulator is that while it is effective as a nonconductor upon the short term usage, Bakelite and similar type resin insulators when submerged in water for any length of time, have a tendency to absorb moisture, probably within their inherent pores, and which moisture itself eventually weakens the insulator and further functions as a slight conductor of charge from the electrode to the vessel of the boiler or other equipment in which it is mounted and in contact. Hence, while such electrodes are effective in their early stages of usage, they have eventually become self deteriorated due to their prolonged exposure to moisture, since any such electrode, and their insulator, must by necessity be submerged below the water line within the boiler so as to operate effectively for its intended purpose. Furthermore, where such insulators were employed in supporting a grounding device through the wall of a pressure vessel, on occasion a blowout would occur due to its weakened condition through prolonged exposure to moisture.

It is, therefore, the principal object of this invention to provide an improved apparatus that functions as a better electrolyte than the water within a water treating or handling system, and therein conduct the dynamic electric energy from the water through its conductor and transfer it externally of the boiler, thereby eliminating the formation of scale, lime, and sludge deposit upon the interior surface of such equipment, and consequently reducing its incidence to pitting and corrosion.

A further object of this invention is to provide an apparatus for removing electrolytic energy from water within water treating equipment, thereby reducing the deleterious effects of mineral matter contained within such equipment, and thereby enhancing significantly its heating efficiency.

A further object of this invention is to provide a descaling apparatus for water treatment equipment that operates effectively while eliminating substantially the maintenance and operating service normally required of such equipment.

A further object of this invention is to provide a grounding apparatus for water treating equipment that effectively removes older formed scale deposits adhering to the inner surfaces of such equipment, as below its water line.

Another object of this invention is to provide a compact conductive member that may be located at the cold water inlet of water handling equipment, and at this location effectively eliminate any inherent electrostatic charge contained within the incoming water, thereby substantially reducing scale deposits upon the metallic surfaces of such equipment.

These and other objects will become more apparent to those skilled in the art upon reviewing the summary of this invention, and upon undertaking a study of its preferred embodiment in view of the drawings.

SUMMARY OF THE INVENTION

This invention contemplates the improved formation of grounding devices for use in removing electrostatic or electrolytic charge normally inherent within many fluids, such as water, particularly during application of water handling equipment. The essence of this invention is to provide for the disposition of a better electrolyte then the water within such equipment, so that the mineral salts or trace minerals will not be electrolytically transferred and adhered by means of electric charge inherent in the water to the conductive surface of the water handling equipment, but rather, the said charge will be grounded by means of a properly disposed conductive apparatus, thereby eliminating the vehicle normally furnishing the mineral conveyance. Hence, the charge within the flowing water, as in a boiler, is diverted to a grounding device conveniently disposed within said body of water, with the mineral deposits not being conducted for forming scale upon the inner surfaces of the apparatus vessel, but rather, such minerals will continue to flow within the stream of the water movement and be summarily discharged from the equipment rather routinely. More significantly, the reduction of scale deposits in this manner has been found to effectively enhance the efficiency of operation of many water handling equipment, and in some cases has raised the heat efficiency, as in the case of boilers, by as much as ten to twenty percent over boilers not containing an equivalent grounding apparatus as explained in this application. Hence, boiler surfaces remain free from scale or other sludge deposits, the exchange of heat conductively from the boiler tubes to the water readily occurs, therefore giving rise to the highly efficient operation of any equipment incorporating a conductive apparatus constructed in accordance with the teachings of this invention.

More specifically, this invention includes variations upon the preferred embodiment of a grounding apparatus, and generally includes conductive apparatuses of three types, either of the in-pipe disposed probe unit, a lay-in model that may be supported upon the fire tubes or heat exchanger contained within smaller boilers, or even a high pressure model that incorporates more stable mounting within steam boilers that build up a high degree of vapor pressure during their energy conversion function.

Even more important is the thought given to the formation of the various insulating components that are designed for acting just in that manner as an insulator that prevents the conductor exposed to the water from coming into contact with the metallic surfaces of the various vessels or equipment in which this invention locates. As previously reviewed, prior art insulating supports were generally formed of Bakelite, and have been found to breakdown over extended usage due to their inherent ability to absorb moisture, particularly around their joints, where the electrode secures with the insulating bushing formed of this material.

After prolonged usage, such a formed bushing has been found to become conductive, allowing the conduct of some charge, in the vicinity of a potential of a few millivolts, to the jacket of the vessel, thereby defeating the purpose of its usage. Through experimentation it has been found that a nonconductive mounting means that not only supports the conductive apparatus or electrode within the vessel rigidly, but also exhibits moisture nonabsorbing attributes has been found to work very successfully over long periods of time, being totally resistant to eventual breakdown as through moisture absorption, as has occurred with the identified prior art devices. More specifically, a nonconductive mounting means that is formed of one of the fluoroplastics has functioned very effectively in practice. Fluoroplastics in the category of polytetrafluoroethylene, polychlorotrifluoroethylene, polyvinylidene fluoride, or fluorinated ethylene propylene resin, have functioned very successfully in forming the mounting means of this invention, which either rigidly secures the conductive apparatus to the wall of the vessel, or simply supports a tubular formed conductive member upon the heat exchanger of a boiler. A mounting means or support formed of a chloro or fluoro hydrocarbon has functioned effectively for the purposes of this invention.

This invention further contemplates the particular design of the mounting means or bushing in its securement with the conductive member, and preferably having tapered threads that form a very tightened connection between these two components, in addition to the connection between the mounting means and the wall of the vessel, so that in the case of the in-pipe type of conductive apparatus, a fluid tight seal, or hermetic seal, can be easily made for lasting effect. Furthermore, various caps, in addition to the mounting means, may also be formed of the various fluoro carbons, as for example, Teflon, which may be acquired from the duPont Company, of Willmington, Del., and act effectively for shielding against contact between the inserted ends of the conductive members of this conductive apparatus so that no contact may be made with either the interior walls of the water vessel, or its heat exchanger, which contact would completely detract the grounding effects of such an electrode if no such contact was made.

DESCRIPTION OF THE PREFERRED EMBODIMENT

Figure 1:
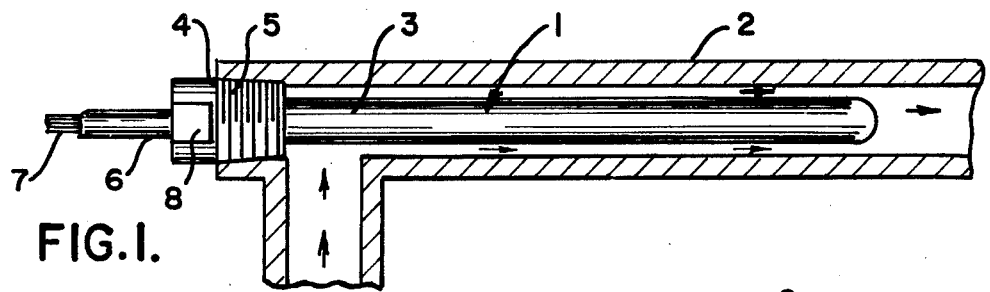
FIG. 1 provides a sectional view of the cold water inlet conduit associated with an item of water handling equipment and disclosing the mounted insertion of the in-pipe style of conductive apparatus of this invention.
Figure 2:
FIG. 2 provides a perspective view of a conductive apparatus of this invention.
Figure 3:
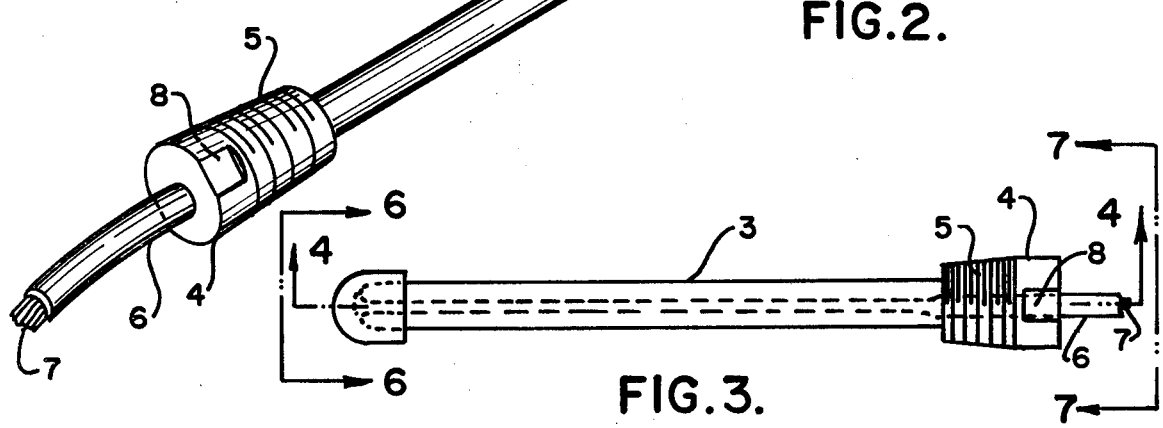
FIG. 3 provides a side view of the conductive apparatus of FIG. 2.

In referring to the drawings, and in particular FIGS. 1 through 3, there is disclosed a conductive apparatus 1 of this invention as shown mounted within preferably the cold water conduit 2 leading to the vessel of a water or other fluid handling equipment. The conductive apparatus comprises a conductive member 3 that extends for some distance in the nature of a probe inwardly longitudinally of the conduit 2, said member being secured at one end through the agency of a nonconductive mounting means 4, which secures by means of retainer means, such as the threads 5, interiorly of the conduit 2. Extending from the exterior end of the conductive apparatus 1 is a cable 6 that includes strands of conductors 7 that are electrically connected with the conductive member 3 so as to furnish a means for grounding of any electric charge contained within the fluid flowing through the said conduit.

Figure 7:
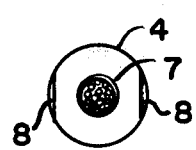
FIG. 7 provides an opposite end view of the conductive apparatus taken along the line 7—7 of FIG. 3.

To facilitate the tightening of the conductive apparatus within the conduit 2 during its fastening, a pair of flattened but parallel surfaces, as shown at 8, are provided to either side of the mounting means 4 so as to accommodate the application of a wrench thereon to facilitate its snug installation. (See also FIG. 7). Upon the opposite end of the conductive member 3 may be a cap 9 that is intended to function as an insulator for this proximate end of the said member so as to insure that the apparatus does not make contact with any metallic surface integral of the water handling equipment, or its conduit 2, and which would curtail the ability of the conductive apparatus 1 from grounding the electrostatic charge contained within the passing fluid.

Figure 4:
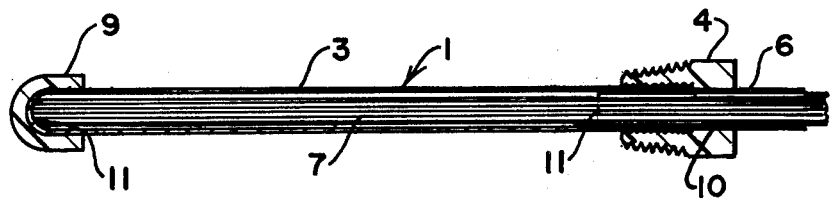
FIG. 4 provides a longitudinal sectional view of the conductive apparatus taken along the line 4—4 of FIG. 3.
Figure 6:
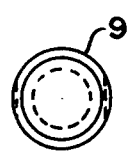
FIG. 6 provides an end view of the conductive apparatus taken along the line 6—6 of FIG. 3.

FIG. 4 discloses a sectional view of the conductive apparatus, showing the end cap 9 located at its potentially inserted end, with the mounting means 4 at its opposite end. By way of comment, the cap may be formed of the same fluoro plastic as the mounting means 4 is formed of. The cable 6 extends into an aperture 10 provided through the mounting means 4, and proximate the vicinity 11 of the conductive apparatus the jacket for the cable is removed and its series of conductors 7 continue therethrough to the opposite end of said conductive member 3, where they are brazed, as at 11, in place internally to the member 3 at this location. Brazing may be required when the member 3 may be formed of a brass.

Figure 5:
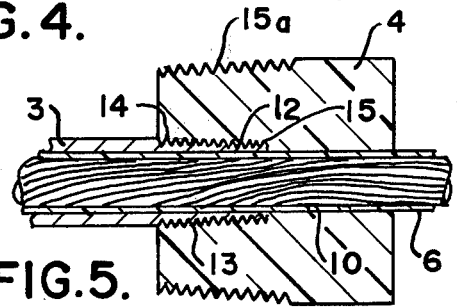
FIG. 5 provides an enlarged view of that portion of the conductive apparatus showing the securement between its conductive member and its insulated mounting means.

It is important that adequate seals be provided between the conductive member 3 and the mounting means 4, in addition to the latter's securement by way of the retainer means 4 to the wall of the water vessel or its conduit 2, as previously analyzed. By referring to FIG. 5, an enlarged view of this segment of the conductive apparatus is disclosed. The outer periphery of the mounting means 4 is provided with a series of threads 15a, and which threads are tapered having a decreasing crest diameter in the direction of the conductive member so that as the apparatus is fastened by means of wrench power into the conduit 2 or a vessel wall, these tapering threads provide for and insure a fluid tight seal that will prevent any conveyance or grounding of charge at this location. Hence, the electrical charge grounding effect of the conductive apparatus of this invention is assured when constructed in the manner of this invention, having the tapering threaded connection as shown, and when formed of a fluoro plastic that resists any moisture absorption. Essentially, the aperture 10 provided through the member 4 is flared, as at 12, and is internally threaded over this area so as to provide the threads for securement with the threaded end 13 of the member 3 therein. The tapering of these threads in this manner provides for an insured tightened fit between these two components when the conductive apparatus is assembled, and especially eliminates the chance of any moisture creeping therein and which could cause a breakdown in the operations of this invention, as previously analyzed in the background of the same. The tapering threads have a larger crest diameter as at the threading region 14, than they do at its threaded segment 15 so that the continued tightening of the member 3 within this flared threaded end 12 of the mounting means 4 provides for a fluid tight seal at this location. As previously analyzed, when you couple the style of seal formed by these two components through their threaded engagement, with the fact that the mounting means 4 of this invention is formed of a non-moisture absorbing nonconductive fluoro plastic, there is little chance that electrical breakdown will occur in this apparatus as such has occurred with related type electrodes that are formed having a style of Bakelite bushing proximate this location.

Figure 8:
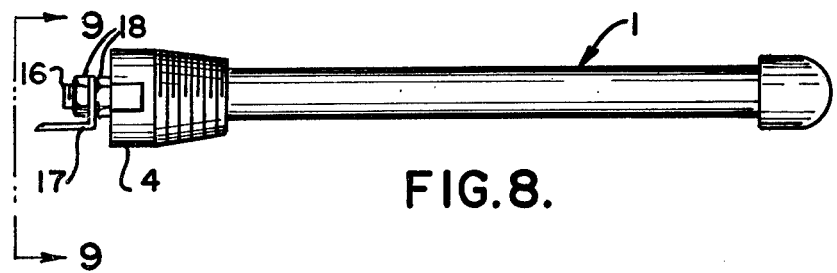
FIG. 8 discloses a slightly modified form of the in-pipe style of conductive apparatus having a mounting lug finished at its exterior end.
Figure 9:
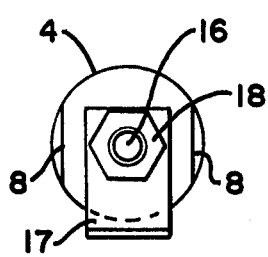
FIG. 9 provides an end view of the conductive apparatus taken along the line 9—9 of FIG. 8.
Figure 10:
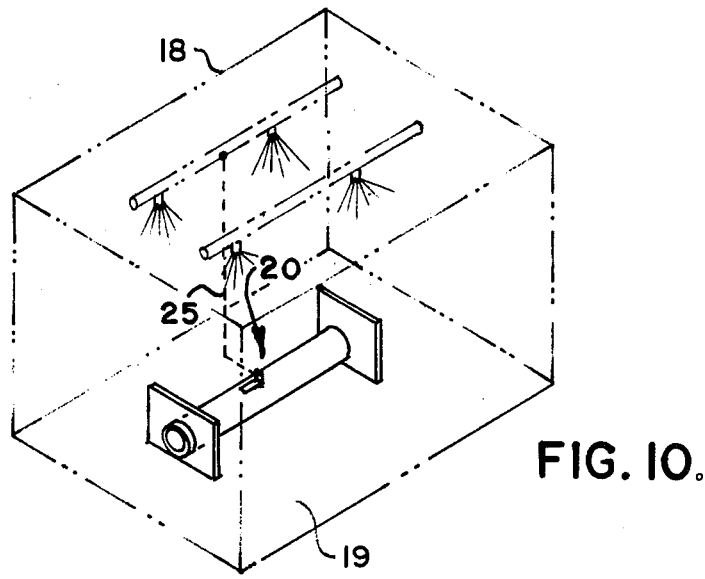
FIG. 10 discloses a modified form of conductive apparatus of this invention as located within a cooling tower.
Figure 11:
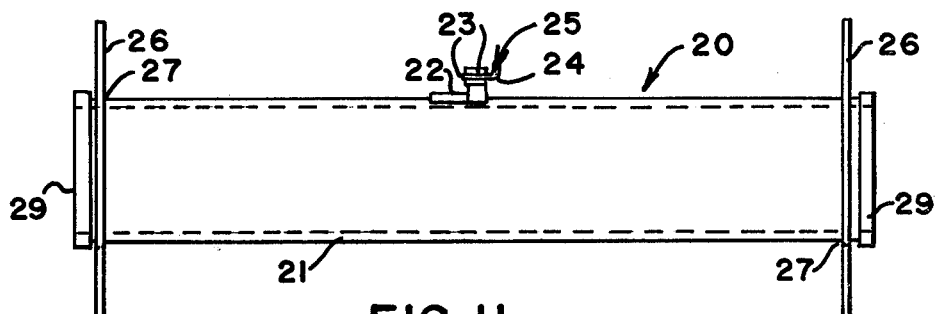
FIG. 11 provides a side view of the conductive apparatus shown in FIG. 10.
Figure 12:
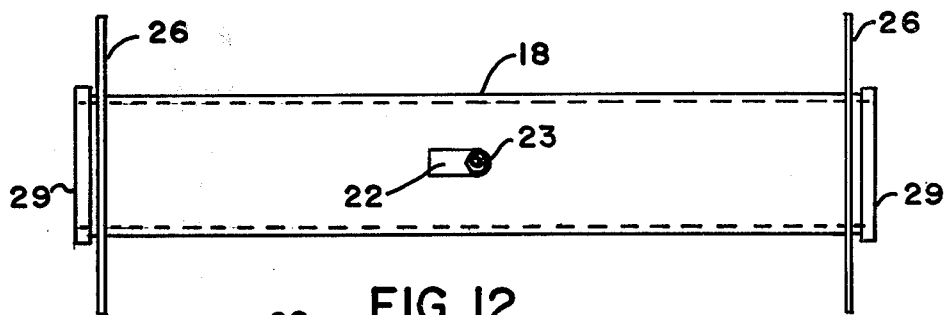
FIG. 12 provides a plan view of the conductive apparatus shown in FIG. 10.

A slight modification to the style of conductive apparatus 1 is shown in FIG. 8, wherein the wiring provided internally of the conductive member 3 are secured, as by brazing, to a lug 16 so that an eyelet or other form of connector 17 can be easily secured by means of the nuts 18 for ready installation of the grounding cable (not shown) thereto. FIG. 9 also discloses an end view of this external modification to the apparatus, and also discloses the arrangement of the parallel surfaces 8 of the mounting means 4 that accommodate a wrench to provide for the snug and tightened securement of the apparatus into a conduit or vessel wall.

An example of a working model of the style of in-pipe conductive apparatus as shown in FIGS. 1 through 9 includes a conductive member that is formed of a brass pipe, having an outside diameter of approximately ⅜", and being approximately 8" long. The mounting means 4 of the invention may be constructed from a one inch Teflon rod, and drilled to provide for its internal aperture 10, milled as at 12 to provide for its desired taper, and threaded to form its necessary retainer means. The mounting means 4 is then milled to either side so as to furnish the parallel surfaces 8 that furnish the wrench seat useful for tightening the apparatus during installation. And, for a conductive apparatus of this size, a number 6 THW strand wire, insulated, has been found useful to function as the grounding cable 6 for the apparatus. This particular conductive apparatus is used in boilers that operate under 30 psi, even though the particular apparatus has been tested in boilers to determine its effectiveness in attaining a fluidic seal with a conduit 2 can allow its use in conjunction with vessels that attain a pressure as high as 100 psi.

Figure 13:
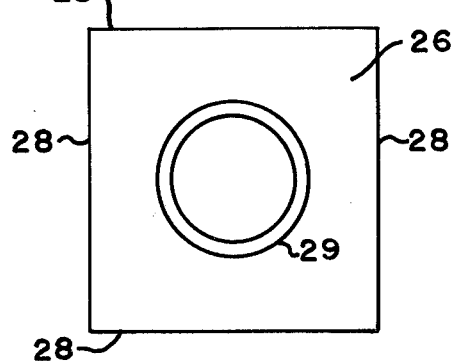
FIG. 13 provides an end view of the conductive apparatus shown in FIG. 10.
Figure 14:
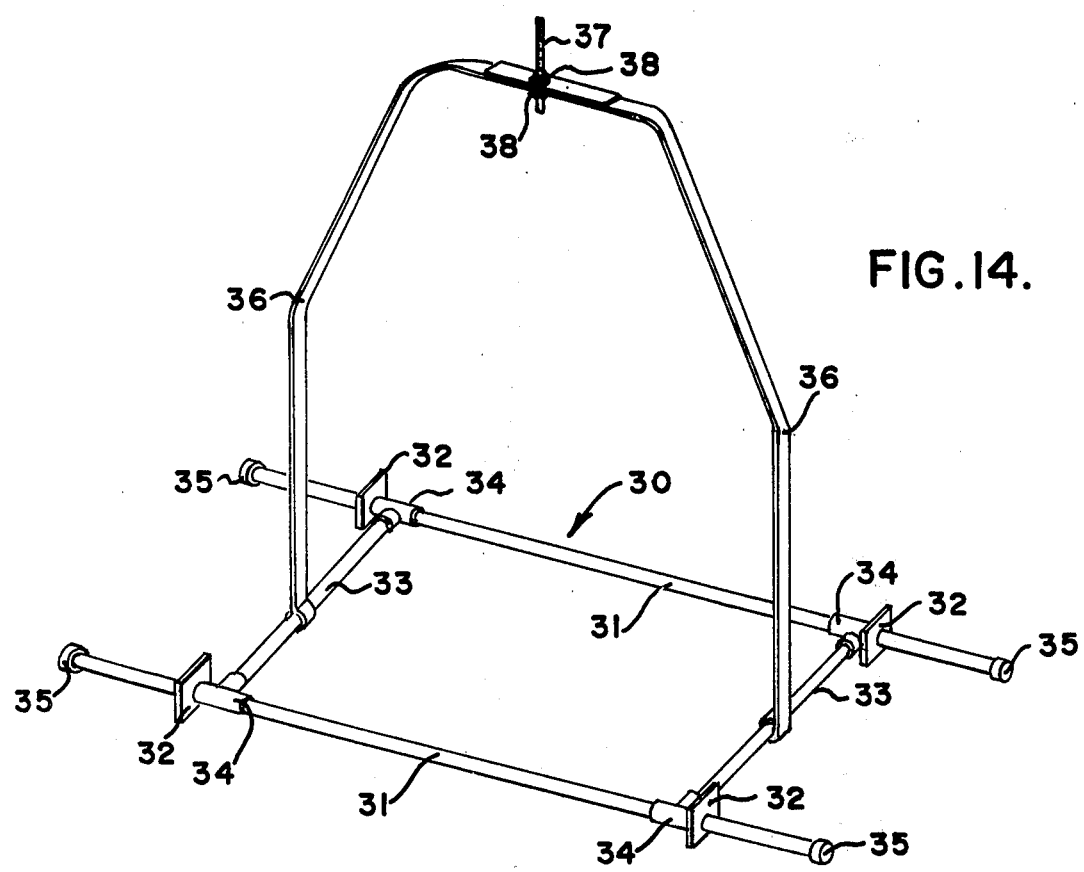
FIG. 14 discloses a further modified form of conductive apparatus of the type normally located within a high pressure boiler.
Figures 15, 16:
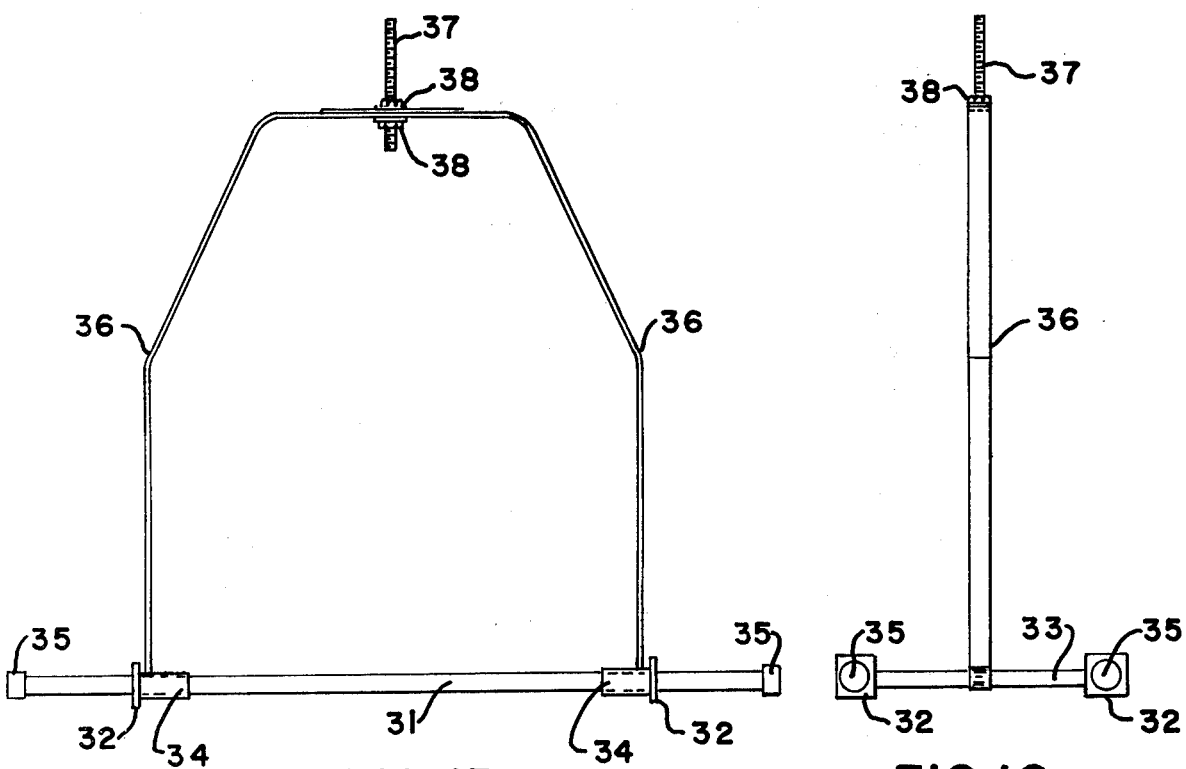
FIG. 15 provides a side view of the conductive apparatus shown in FIG. 14.
FIG. 16 provides an end view of the conductive apparatus shown in FIG. 14.

FIGS. 10 through 13 disclose what is identified as the lay-in type of conductive apparatus unit that can be simply rested within for example, a cooling tower, as shown at 18, by resting the same upon its base 19. Such unit can also be used in other apparatuses such as an evaporative condensor, or the like. The unit 20 comprises a length of tube 21 that is generally open through its interior, and which tube may be formed of copper, brass, or other conductive material. Proximate the midpoint of the tube is provided a lug 22 which may be formed of copper or other conductive metal, and which is integrally secured as by brazing to the surface of the tube 21. A pair of nuts 23 turn upon a threaded means formed as part of the lug (not shown), and in this manner secure intermediate thereof the eyelet 24 that connects with the grounding cable 25. Proximate each end of The tube 21 there is provided a mounting means 26 which in this particular instance comprises a flattened sheet of a fluoro plastic, such as one made of Teflon, and which sheet includes an aperture, as at 27, which allows for the supports to be slidingly inserted onto the tube 21. These supports, as can also be seen in FIG. 13, are flattened at least on one side 28, at least at one location, so as to allow the unit to be stably rested upon some part of the apparatus, as previously identified, and therein function to act as a source for grounding of any of the electrostatic charge that is prevalent within the water contained or passing through the said tower 18. Also upon each end of the tube 21 of the conductive apparatus 20 is a ring like member 29 that may also be formed of the same material as the tube 21, such as brass, and then slipped onto the proximate end of said tube and brazed in place. The reason for the installation of such rings is to prevent the supports 26 from being removed from their conductive apparatus. The external diameter of the rings 29 are greater than the internal diameter of the aperture 27 provided through each support 26, even though said internal diameter 27 is greater than the outside diameter of the tube 21.

In usage, the conductive member 20 is rested upon the base of the apparatus 18, and then its conductor 25, having been secured to the lug 22, then extends to the wall above the water line of the tower, preferably in its upward regions, and further extends through the same to a source of grounding. Where the conductor 25 extends through the wall of the apparatus 18, it is preferably insulated therefrom, as by its surrounding nonconductive cable jacket, so as to prevent any contact between this grounding wire and the wall of the tower itself, which as previously described, would have a deleterious effect upon the grounding attributes of this conductive apparatus. One advantage of the invention as designed in this manner is that the supports 26, as formed from a fluoro plastic, does not absorb moisture even though they are submerged in water for an indefinite period of time. As previously commented, any type of support or insulator of this nature that may be formed of Bakelite or other material does eventually breakdown, absorbs sufficient moisture to conduct energy from the water to the conductive apparatus, and through its wettened supports to the heat exchanger 19, which therein breaks down the grounding attributes and any incident benefits of this invention. Prior art apparatuses of this nature have been found to fatigue due to fracture or moistening of its bushing, such as Bakelite made bushing, and corrosive scale has then even formed on the Bakelite bushing itself. Furthermore, the particular style of tube 21 of this invention is designed to allow some water to pass through its interior, as can be seen, and its length may be to any length desired so as to achieve a full grounding effect of the water passing through the boiler 18. For example, in practice, a tube of one foot has worked effectively for a small water treating and handling apparatus, even though a tube of up to ten feet in length may be desired for larger apparatuses.

A further modification to this invention is shown in FIGS. 14 through 17. This unit is of a type that is designed for use within a high pressure type of steam boiler, and therefore, includes not only a conductive apparatus for use in grounding out the electrostatic charge from the water within the boiler, but also includes a bracing means for use in fastening or securing the conductive apparatus in place. The apparatus 30, in this embodiment, includes a pair of rods or tubes 31 having sufficient length, with each tube including a support 32, similar in design to the supports 28 previously identified, and which is formed of a fluoro plastic in order to prevent the conduct of charge through the supports and to any heat exchanger that the conductive apparatus may come in contact with. The tubes 31 are fixed apart by means of the cross braces 33, which secure by means of a tee joint or other forms of fastening to the tubes 31, as shown at 34. Since the unit when placed within a high pressure boiler will be exposed to surging water or other type water pressure, caps 35 are provided upon each end of the tubes 31 so as to prevent the passage of water therethrough, which would have a tendency to shift the apparatus, but likewise said caps prevent the tubes 31 from coming into contact with any conductive metal, since these caps preferably are also formed of a nonconductive material, such as Teflon.

Figure 17:
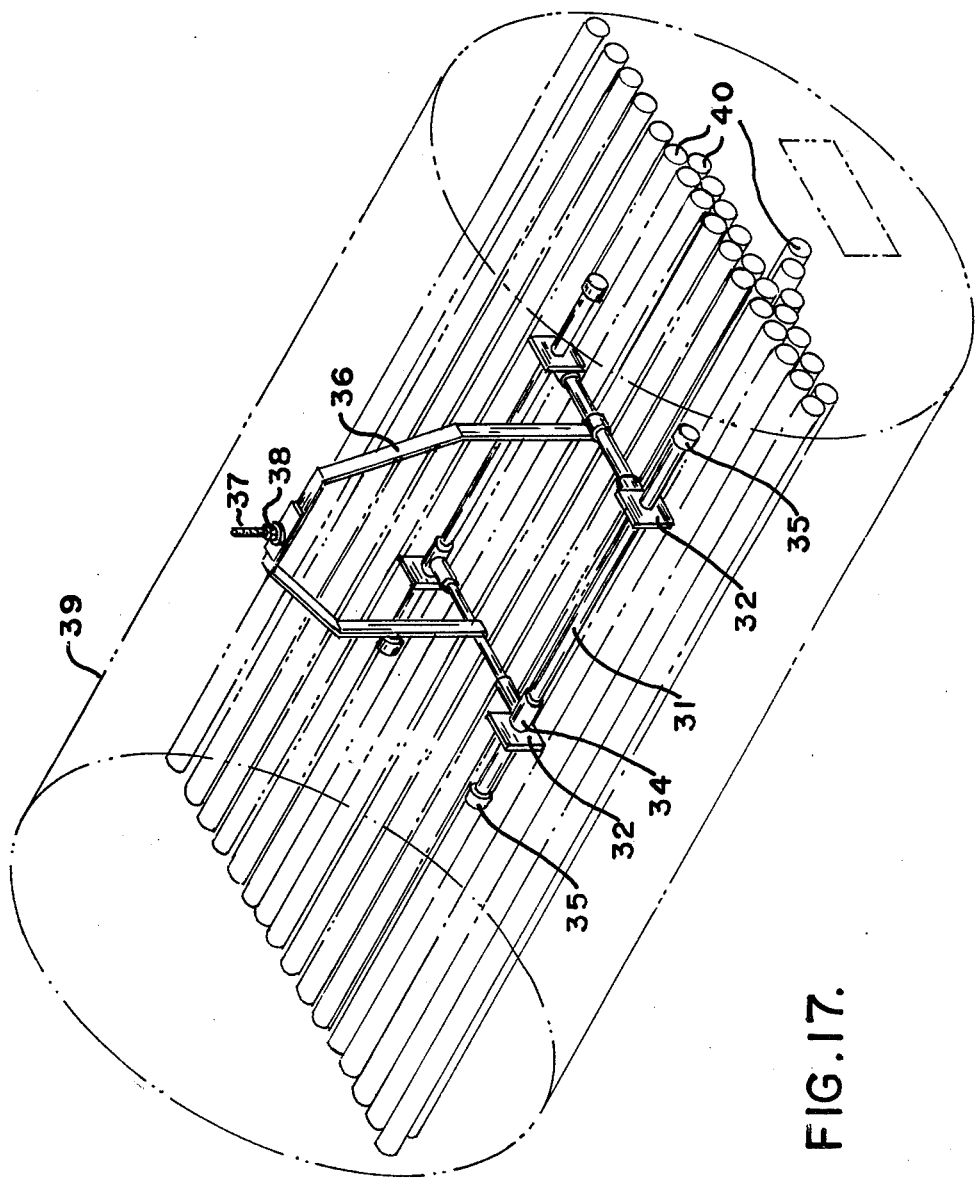
FIG. 17 provides a view of the conductive apparatus of FIG. 14 shown as installed within a high pressure boiler.

Extending upwardly from the braces 33 are straps 36 that are adjustably secured to a threaded rod 37 by means of a pair of fasteners 38. The threaded rod 37 extends upwardly a sufficient distance so as to provide for its insertion through an aperture provided at the top of the boiler, such as the boiler 39, as can be seen in FIG. 17. This rod 37 is insulated from the boiler by means of any form of insulated sleeve (not shown), and is tightened in place through the boiler so as to insure stability in the arrangement of the conductive apparatus 30 upon the heat exchanger 40 normally provided within the vessel of a high pressure boiler 39. The supports 32 are of sufficient dimension so as to provide displacement of the conductive aspects of the apparatus 30 upwardly, and out of contact with either the tubes of a heat exchanger 40 or the walls of the vessel 39. Hence, the conductive apparatus is conveniently disposed within the flow of water within the boiler 39, and therein grounds to externally of the vessel any electrostatic charge that may be present within its contained water. It may also be commented that the threads upon the threaded rod 37 are of tapered design, so as to provide for their snug retention of the apparatus at this location and to the jacket of the boiler 39, and therein provide a fluidic and hermetic seal so as to prevent the escape of any steam pressure from the same.

Various modifications or changes may be made by those skilled in the art upon reviewing subject matter of this invention. Any such changes or modifications that are encompassed by the claims herein and fit within the spirit and scope of the invention as described are intended to be protected by any patent issuing hereon. The preferred embodiment and its modifications as defined herein are set forth for illustrative purposes only.

Having thus described the invention what is claimed and desired to be secured by Letters Patent is:

1. An apparatus for stimulating removal of electrolytic energy from a vessel of water or other charge conveying liquid, said apparatus being of the type for mounting through the wall of such a vessel, comprising, a conductive member provided for disposition within such a vessel and below its water line, a nonconductive mounting means secured with the conductive member and disposed for electrically insulating the said member from the vessel in which it is to be disposed, said mounting means being nonabsorbent of moisture and free of electrical conductivity even after its prolonged submersion in water within a vessel, said mounting means being formed of a fluoro plastic, said mounting means including an aperture therethrough, one end of said conductive member being hermetically connected and threadedly engaged within said mounting means aperture, the threads of said threaded engagement being of decreasing tapering dimension to insure a fluid tight seal between the said conductive member and the mounting means at this location, a conductor extending into the conductive member at its mounting means end and connected to the said member at its opposite end, retaining means provided upon the mounting means for securing the conductive member to a vessel, said retaining means comprising threads, said threads being of decreasing taper in the direction of the connected conductive member, a connecting lug secured to the mounting means at the opposite end of its aperture, said lug being electrically connected with the conductor, said conductor and lug capable of being grounded, whereby said conductive member retains an electrically isolated state with respect to any vessel in which it is mounted and is capable of conducting electrolytic charge through its conductor and to ground from any water located in such a vessel.

2. The invention of claim 1 including a cap disposed upon and electrically insulating the said opposite end of the conductive member, and said cap being constructed of an electrically nonconductive material.

3. The invention of claim 1 wherein said electrically nonconductive mounting means is formed of polychlorotrifluoroethylene.

4. The invention of claim 1 wherein said electrically nonconductive mounting means is formed of polyvinylidene fluoride.

5. The invention of claim 1 wherein said electrically nonconductive mounting means is formed of fluorinated ethylene propylene resin.

6. An apparatus for stimulating removal of electrolytic energy from a vessel of water or other charge conveying liquid, said apparatus being of the type for disposition within such a vessel and below its water line, comprising at least a pair of tubes for disposition within such a vessel, at least one cross brace interconnecting said tubes, a strap secured to said brace and extending upwardly therefrom, a conductor for extending through an aperture of the vessel, fastening means connecting the strap to the conductor, said tubes, braces, strap and fastening means being formed of electrically conductive material so that the tubes can be electrically grounded through the conductor, each tube and being formed of a fluoro plastic so as to be nonabsorbent of moisture and free from electrical conductivity even after its prolonged submersion in water within a vessel, said mounting means comprising a pair of supports, each support having an aperture therein and disposed for reception of a tube therethrough, one of said supports arranged close to each end of the tube to insulatingly space it from the vessel in which it may rest, and means being provided at each end of a tube having a dimension larger than the support aperture to prevent removal of the support.

7. The invention of claim 6, wherein the last mentioned means comprises a cap disposed upon each end of a tube, each cap being formed of a fluoro plastic nonconductive material to insulate the tube from any vessel in which it locates.

* * * * *